(12) United States Patent
Banavali et al.

(10) Patent No.: US 8,247,500 B2
(45) Date of Patent: Aug. 21, 2012

(54) GUANIDINE-SUBSTITUTED RESIN FOR TRANSESTERIFICATION

(75) Inventors: Rajiv Manohar Banavali, Rydal, PA (US); Alfred Karl Schultz, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 429 days.

(21) Appl. No.: 12/322,568

(22) Filed: Feb. 3, 2009

(65) Prior Publication Data
US 2009/0221844 A1    Sep. 3, 2009

Related U.S. Application Data

(60) Provisional application No. 61/067,428, filed on Feb. 28, 2008.

(51) Int. Cl.
*C08F 8/30* (2006.01)
*C08F 8/32* (2006.01)
*C08C 19/22* (2006.01)
*C07C 67/03* (2006.01)

(52) U.S. Cl. ........... 525/330.5; 525/328.2; 525/328.3; 525/330.3; 525/333.3; 525/333.6; 525/374; 525/379; 525/382; 564/230; 564/236; 560/129; 560/217; 560/189

(58) Field of Classification Search ............... 525/374, 525/379, 382, 328.2, 328.3, 330.3, 330.5, 525/333.3, 333.6; 564/230, 236; 560/129, 560/189, 217
See application file for complete search history.

(56) References Cited

U.S. PATENT DOCUMENTS

| 4,992,200 | A | | 2/1991 | Lin et al. | |
|---|---|---|---|---|---|
| 5,340,380 | A | * | 8/1994 | Virnig | .......................... 75/744 |
| 5,726,253 | A | | 3/1998 | Le Perchec et al. | |

OTHER PUBLICATIONS

Schuchardt, et al., "Alkylguanidines as catalysts for the transesterification of rapeseed oil", J. Molecular Catalysis, vol. 99, pp. 65-70 (1995).
Gelbard, "Polynitrogen strong bases as immobilized catalysts for the transesterification of vegetable oils", C.R. Acad. Sci. Paris, Chimie/Chemistry,vol. 3, pp. 563-567 (2000).
Schuchardt, et al., "Transesterification of soybean oil catalyzed by alkylguanidines heterogenized on different . . . ", J. Molecular Catalysis, vol. 109, pp. 37-44 (1996).

* cited by examiner

*Primary Examiner* — Roberto Rabago
(74) *Attorney, Agent, or Firm* — Tifani M. Edwards; Kenneth Crimaldi

(57) ABSTRACT

A polymeric resin comprising guanidine groups having at least one $C_4$-$C_{22}$ tertiary alkyl substituent.

5 Claims, No Drawings

GUANIDINE-SUBSTITUTED RESIN FOR TRANSESTERIFICATION

This application claims the benefit of priority under 35 U.S.C. §119(e) of U.S. Provisional Patent Application No. 61/067,428 filed on Feb. 28, 2008.

BACKGROUND

This invention relates generally to a guanidine-substituted resin catalyst for transesterification of esters, e.g., glyceryl esters, with alcohols.

High fuel prices and environmental concerns are driving development of alternative fuels, especially those derived from renewable resources. One such fuel, commonly known as "biodiesel" fuel, contains methyl esters of fatty acids, and is burned in diesel engines. Biodiesel fuel is produced from transesterification of triglycerides, such as vegetable oils, with methanol. For example, Gelbard et al., *C.R. Acad. Sci. Paris, Série IIc, Chimie*, vol. 3, pp. 563-7 (2000); demonstrated that a guanidine-substituted resin exhibited catalytic activity for the methanolysis of vegetable oil. However, the resin produced low yields and/or long reaction times.

The problem addressed by this invention is to find an alternative heterogeneous catalyst for transesterification of esters with alcohols.

STATEMENT OF INVENTION

The present invention is directed to a resin comprising guanidine groups, each of which comprises at least one $C_4$-$C_{22}$ tertiary alkyl substituent, to a method for transesterifying glyceryl esters to fatty acid alkyl esters by contacting the resin with glyceryl esters and $C_1$-$C_4$ alcohols, and to a method for catalyzing organic condensation reactions.

DETAILED DESCRIPTION

All percentages are weight percentages, and all temperatures are in °C., unless otherwise indicated. Weight percentages in resins are based on dry resin. An "organic" group is a substituent group containing from one to twenty-two carbon atoms, and hydrogen atoms, and containing no metals, other than as trace-level impurities. Preferably, organic groups may contain, in addition to carbon and hydrogen, only element(s) selected from nitrogen, phosphorus, oxygen, sulfur, and halogens; or alternatively, only element(s) selected from oxygen and nitrogen. An "alkyl" group is a saturated hydrocarbyl group having from one to twenty-two carbon atoms in a linear, branched or cyclic arrangement. Preferably, alkyl groups are unsubstituted and acyclic. A "heteroalkyl" group is an alkyl group in which one or more carbons have been replaced with oxygen or nitrogen atoms. A "glyceryl ester" is a mono-, di- or tri-fatty acid ester of glycerine. Triglycerides used in this invention preferably are in the form of vegetable oils, but animal fats can also be used as a starting material. Fatty acids are acyclic aliphatic carboxylic acids containing from 8 to 22 carbon atoms; typically, they contain from 12 to 22 carbon atoms. With respect to carbon-carbon bonds, the fatty acids may be saturated, monounsaturated or polyunsaturated (typically 2 or 3 carbon-carbon double bonds). Natural fats may also contain small amounts of other fatty acids, as well as small amounts (1-4%) of phospholipids, e.g., lecithin, and very small amounts (<1%) of other compounds, e.g., tocopherols.

As used herein the term "(meth)acrylic" refers to acrylic or methacrylic. The term "vinyl monomer" refers to a monomer suitable for addition polymerization and containing a single polymerizable carbon-carbon double bond. The term "styrene polymer" or "styrenic polymer" indicates a copolymer polymerized from a vinyl monomer or mixture of vinyl monomers containing at least one styrene monomer (styrene or substituted styrene) and/or at least one crosslinker, wherein the combined weight of styrene monomers and crosslinkers is at least 50 wt % of the total monomer weight, alternatively at least 75 wt %, alternatively at least 90 wt %. Styrene monomers include, e.g., styrene, α-methylstyrene, and ethylstyrene. A crosslinker is a monomer containing at least two polymerizable carbon-carbon double bonds, including, e.g., divinylaromatic compounds, di- and tri-(meth)acrylate compounds and divinyl ether compounds. Preferably, the crosslinker(s) is a divinylaromatic crosslinker, e.g., divinylbenzene. In one embodiment, a styrene polymer is made from a mixture of monomers that is at least 75% styrene and divinylaromatic crosslinkers, more preferably at least 90% styrene and divinylaromatic crosslinkers, and most preferably from a mixture of monomers that consists essentially of styrene and at least one divinylaromatic crosslinker. In another embodiment, a styrene polymer is made from a monomer mixture consisting essentially of at least one divinylaromatic crosslinker. The term "acrylic polymer" indicates a copolymer formed from a mixture of vinyl monomers containing at least one (meth)acrylic acid or ester, along with at least one crosslinker, wherein the combined weight of the (meth)acrylic acid(s) or ester(s) and the crosslinker(s) is at least 50 weight percent of the total monomer weight; preferably at least 75%, more preferably at least 90%, and most preferably from a mixture of monomers that consists essentially of at least one (meth)acrylic acid or ester and at least one crosslinker.

In some embodiments of the invention, the triglyceride contains no more than 5% free (unesterified) fatty acids, alternatively no more than 4%, alternatively no more than 3%, alternatively no more than 2%, alternatively no more than 1%, alternatively no more than 0.75%, alternatively no more than 0.5%, alternatively no more than 0.3%. Free fatty acids are undesirable because they cause problems resulting from contamination of the reaction mixture and/or the product with free fatty acids, including foaming in the reaction mixture. Moreover, free fatty acids may neutralize the basic guanidine groups and interfere with catalysis.

In some embodiments of the invention, the guanidine groups comprise two $C_4$-$C_{22}$ tertiary alkyl substituents. The guanidine groups also may comprise other alkyl substituents. In some embodiments of the invention, the resin is functionalized as shown in the following structure, in which "R" indicates the resin or a "spacer" group attached to the resin; $R^1$ is hydrogen or $C_1$-$C_4$ alkyl, preferably hydrogen or methyl, most preferably hydrogen; and $R^2$ is $C_4$-$C_{22}$ tertiary alkyl. $R^2$ may represent the same or different $C_4$-$C_{22}$ tertiary alkyl substituents.

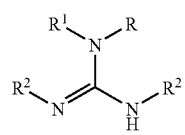

This structure is intended to encompass possible tautomeric forms, including the following forms when $R^1=H$:

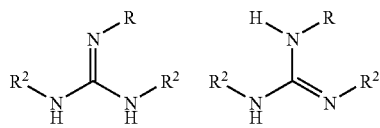

In some embodiments of the invention, the guanidine groups comprise at least one $C_8$-$C_{22}$ tertiary alkyl substituent, alternatively at least one $C_9$-$C_{22}$ tertiary alkyl substituent, alternatively at least one $C_{10}$-$C_{22}$ tertiary alkyl substituent.

In some embodiments of the invention, the resin comprises a crosslinked polystyrene or acrylic backbone to which the guanidine groups are attached via covalent bonds. In some embodiments of the invention, the guanidine groups are attached or formed via a pendant group on the resin; in other embodiments, the guanidine groups are attached to a group on a "spacer" group attached to the resin at one end and having functionality allowing attachment or formation of a guanidine group at the other end. For example, a pendant amino group may be, for example, an aminomethyl group attached to a polystyrene phenyl group, or a longer "spacer" group attached to the resin and having an amino group at the other end. In some embodiments of the invention, the spacer group is a $C_1$-$C_{10}$ organic group; alternatively a $C_1$-$C_{10}$ linear alkyl or heteroalkyl chain, or a $C_1$-$C_{10}$ chain having an ester or amide group, e.g., an amino-amide spacer formed from reaction of an amino acid with the resin amino group. Alternatively, the spacer group is a $C_2$-$C_8$ linear alkyl chain. The spacer group may be attached directly to the phenyl group or to an aminomethyl or hydroxymethyl group attached to the phenyl group. In some embodiments of the invention, the attached guanidine groups are formed, for example, through reaction of a carbodiimide with a pendant amino group on the resin or the spacer group, alternatively by reaction of said amino group with a cyanamide, alternatively by reaction of said amino group with an unsubstituted guanidine, alternatively by reaction of said amino group with methyl isothiourea, especially when said amino group is a secondary amine (see, e.g., Dodd, D. S. & Zhao, Y., *Tetrahedron Lett.*, 2001, vol. 42, 1259.) In some embodiments of the invention, the resin is an acrylic resin in which the guanidine groups are attached to acrylic ester alkyl groups bearing reactive substituents such as amino and hydroxyl, e.g., via reaction of a carbodiimide and a 2-aminoalkyl(meth)acrylate residue, e.g., 2-aminoethyl(meth)acrylate.

In some embodiments of the invention, the guanidine group is formed in part from tertiary alkyl primary amines. Examples of such tertiary-alkyl primary amines are the PRIMENE™ amines available from Rohm and Haas Company; Philadelphia, Pa. For example, an isomeric mixture of $C_{16}$ to $C_{22}$ tertiary alkyl primary amines (PRIMENE JM-T); an isomeric mixture of $C_8$ to $C_{10}$ tertiary alkyl primary amines (PRIMENE BC-9); an isomeric mixture of $C_{10}$ to $C_{15}$ tertiary alkyl primary amines (PRIMENE 81-R); or mixtures thereof.

In some embodiments of the invention, the concentration of guanidine groups on the resin is from 0.2 to 14 meq/g, alternatively from 0.4 to 8 meq/g. Preferably, the concentration of guanidine groups on the resin is at least 0.6 meq/g, alternatively at least 1 meq/g alternatively at least 2 meq/g. Preferably, the concentration of guanidine groups on the resin is no greater than 6 meq/g, alternatively no greater than 5 meq/g, alternatively no greater than 4 meq/g.

The term "gel" resin applies to a resin which was synthesized from a very low porosity (0 to 0.1 cm³/g), small average pore size (0 to 17 Å) and low B.E.T. surface area (0 to 10 m²/g) copolymer. The term "macroreticular" (or MR) resin is applied to a resin which is synthesized from a high mesoporous copolymer with higher surface area than the gel resins. The total porosity of the MR resins is between 0.1 and 0.7 cm³/g, average pore size between 17 and 500 Å and B.E.T. surface area between 10 and 200 m²/g. In one embodiment of the invention, the resin comprises polymerized units of styrene and a crosslinker, e.g., divinylbenzene. Preferably, the level of crosslinker is at least 1%, alternatively at least 2%.

In some embodiments of the invention, the resin is used as a catalyst for transesterifying triglycerides to fatty acid alkyl esters by contacting the resin with triglycerides and $C_1$-$C_4$ alcohols. Preferably, the alcohol is methanol. Preferably, the resin is in the form of beads, preferably having a harmonic mean size from 100 microns to 1200 microns, alternatively from 150 microns to 900 microns, alternatively from 200 microns to 800 microns. Preferably, the reaction mixture is heated in a temperature range from 45° C. to 120° C. for at least 0.5 hours. Alternatively, the temperature is at least 50° C., alternatively at least 55° C., alternatively at least 60° C., alternatively at least 65° C. Alternatively, the temperature is no greater than 100° C., alternatively no greater than 85° C., alternatively no greater than 80° C., alternatively no greater than 75° C. Alternatively, the reaction time is at least 1 hour, alternatively at least 2 hours, alternatively at least 3 hours, alternatively at least 6 hours. Alternatively, the reaction time is no greater than 24 hours, alternatively no greater than 18 hours, alternatively no greater than 14 hours. In an embodiment where the temperature is no greater than 75° C., the reaction time is at least 3 hours. The catalyst is removed from the reaction mixture by filtration, centrifugation, or any other standard method for separating solids and liquids. Glycerol obtained from the transesterification reaction may be removed as part of a separate liquid phase, or by any other suitable separation technique, e.g., centrifugation, distillation.

In some embodiments of the invention, the resin is used as a heterogeneous catalyst for an organic condensation reaction. Any condensation reaction that can be base-catalyzed is suitable. Examples of such reactions include, e.g., aldol reactions, Knoevenagel reactions, Perkin reactions, Wittig reactions, Thorpe reactions, Darzen reactions, Tollens reactions, etc. The resin is contacted with the reactant or reactants for a particular condensation reaction under typical conditions.

The invention claimed is:

1. A polymeric resin comprising guanidine groups, each of which comprises at least one $C_4$-$C_{22}$ tertiary alkyl substituent wherein
   i) the guanidine groups comprise two $C_4$-$C_{22}$ tertiary alkyl substituents; and
   ii) the resin is a styrenic or acrylic resin;
   and further wherein the resin is functionalized as shown in formula (I)

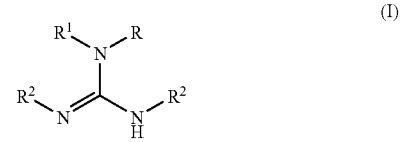

wherein formula (I) encompasses all tautomeric structures; and wherein "R" indicates the resin or a spacer group attached to the resin; $R^1$ is hydrogen or $C_1$-$C_4$ alkyl; and $R^2$ is $C_8$-$C_{22}$ tertiary alkyl.

2. A method for transesterification of glyceryl esters; said method comprising contacting a glyceryl ester with the resin of claim 1 and a $C_1$-$C_4$ alcohol and performing the transesterification reaction.

3. A method for heterogeneous catalysis of an organic condensation reaction having at least one reactant; said method comprising steps of:

(a) providing the resin of claim 1 as a catalyst, (b) contacting said catalyst with said at least one reactant and (c) performing the condensation reaction.

4. The resin of claim 1 in which guanidine groups are present on the resin in a concentration from 0.2 to 14 meq/g.

5. The resin of claim 1 in which $R^1$ is hydrogen.

\* \* \* \* \*